June 27, 1967 H. S. BURT 3,327,836
CONVEYOR DISTRIBUTING SYSTEM
Filed July 12, 1965 9 Sheets-Sheet 1

INVENTOR
HAROLD S. BURT
by: Wallenstein, Spangenburg, Hattis
& Strampel
ATTYS.

June 27, 1967

H. S. BURT 3,327,836

CONVEYOR DISTRIBUTING SYSTEM

Filed July 12, 1965

INVENTOR
HAROLD S. BURT by Wallenstein, Spangenberg, Hattis & Strampel
ATTYS.

June 27, 1967 H. S. BURT 3,327,836
CONVEYOR DISTRIBUTING SYSTEM
Filed July 12, 1965 9 Sheets-Sheet 9

INVENTOR
HAROLD S. BURT
by: Wallenstein, Spangenburg,
Hattis & Strampel
ATTYS.

United States Patent Office 3,327,836
Patented June 27, 1967

3,327,836
CONVEYOR DISTRIBUTING SYSTEM
Harold S. Burt, Wilmette, Ill., assignor to Conveyor Systems, Inc., Morton Grove, Ill., a corporation of Illinois
Filed July 12, 1965, Ser. No. 471,137
14 Claims. (Cl. 198—38)

This application is a continuation-in-part of application Serial No. 422,192, filed December 30, 1964, now Patent No. 3,303,916.

The present invention relates to conveyor systems, and has its most important application to conveyor systems of the type having individual tiltable carrier units capable of carrying relatively heavy loads at high speeds, and wherein the load of a particular carrier unit can be discharged at any one of a number of selected discharge stations.

One of the objects of the invention is to provide a conveyor distributing system, preferably of the type referred to above, having very simple and reliable means for normally maintaining the tiltable portion of each carrier unit upright and tilting the same into a discharge position quickly and easily at any selected discharge station as the carrier unit involved is moving past the station.

Another one of the objects of the invention is to provide a conveyor system using tiltable carrier units with wheels movable over an endless track which includes inclined portions which take the carrier units between different levels and further wherein the carrier units of the conveyor can be moved at a relatively high speed on all portions of the conveyor without the carrier units jumping off the track at the juncture between the inclined and horizontal portions of the track.

Still another one of the objects of the invention is to provide a conveyor system as described where the tiltable portions of the carrier units are trays with a bottom and no sides and wherein the trays can carry articles at high speeds around curves without the boxes falling off the trays.

In the most preferred form of the invention, each tray or other tiltable carrier body is mounted for tilting movement about a longitudinal pivot axis, the carrier body being tiltable, if desired, slightly laterally to either side during the loading of the carrier unit, and being tilted all the way over to either side for discharge purposes when it reaches a selected discharge station. Mechanical, electrical or magnetic coding means may be provided on each carrier unit for identifying at what particular discharge stations the load of the carrier unit is to be discharged. Between the loading station and the selected discharge staiton, each carrier body is maintained in a substantially non-tiltable condition. This is most advantageously achieved in accordance with one aspect of the present invention by a guide channel formed by laterally spaced guide walls which are most advantageously located beneath the path of movement of the carrier units and each tiltable carrier body has a guide roller which rides in the channel which is interrupted or opened where the carrier body is to be tilted or the guide roller is to leave the channel for other reasons.

The carrier body of each carrier unit preferably (although not necessarily) is carried upon a base which has wheels riding on flat laterally spaced tracks and guide rollers on the front and rear thereof positioned between the wheels and riding in the lower portion of the guide channel. Each carrier body has a guide roller riding in the upper portion of the guide channel. The guide rollers of the base of each carrier unit and the guide roller of the carrier body thereof are normally in alignment over the straight portions of the guide channel. However, when the path of travel of the conveyor system changes direction through a curved section of the guide channel, the alignment of the guide rollers of the base portion of each carrier unit and the guide roller of the carrier body cannot be maintained. This difficulty is alleviated by widening or eliminating the wall of the guide channel on the inside of the curve involved to permit the guide roller of the carrier body to move inwardly out of alignment with the guide rollers of the base thereof. An auxiliary carrier body leveling means is used around each curve to keep the carrier body of each carrier unit in an untilted position. These auxiliary means most advantageously are elevated rails near the sides of the carrier bodies which are engaged by rollers on the carrier bodies.

The conveyor system of the present invention is usable to convey the carrier units to different levels by inclined conveyor sections. As a carrier unit goes from a horizontal to an inclined section extending to a different level, substantial shock and inertial forces are brought into play where heavy loads are involved. Where the carrier units ride on wheels, the wheels of the carrier units will tend to jump from the track at the beginning and the end of the inclined track sections which could cause appreciable shock to the conveyor equipment as well as the articles carried thereby. To alleviate this problem, carrier unit hold-down means is provided at the inclined sections of the conveyor for vertically stabilizing the carrier units. The hold-down means most advantageously takes the form of stationary guide walls overlying the tracks where they are contiguous to the upper extremities of the wheels on the base portions of the carrier units.

Opposite each of the discharge stations, one of the guide walls forming the guide channel referred to is interrupted to leave a first gap thereat through which the guide roller of any carrier unit can leave the guide channel to effect tilting of the carrier body. The same guide wall is interrupted at a second location to form a second gap through which the guide roller of the carrier body involved can return to the guide channel. A gate closes the first gap at each discharge station which gate remains closed except when a carrier unit passes having contents to be discharged thereat. The gate is then automatically opened in a preferred manner to be described, permitting the guide roller of the carrier body involved to leave the guide channel as indicated. A gate also closes off the other gap in the guide wall of the guide channel through which a guide roller of the carrier body can return to the guide channel. The first gate member is opened to permit the return of a guide roller at the appropriate time.

The force which initiates the tilting of the carrier body which brings the guide roller thereof out to the guide channel is most advantageously a vertically movable plunger member mounted to one side or the other of the center line of the path of travel of the carrier units. The plunger member has a lowered retracted position where it is out of the path of movement of the tiltable carrier bodies of the carrier units and an extended position where it engages a part of the carrier body and tilts the same laterally outwardly.

The gate which covers the gap in the guide channel through which the guide roller of a carrier body is to leave the guide channel is preferably an inwardly spring urged hinged wall which is normally backed-up by a latch member which securely holds the gate member closed, so that the lateral thrusts of the carrier bodies of the carrier units will not open the same. When a carrier unit having contents which are to be discharged at a particular discharge station reaches the plunger member of that station, the plunger member which is normally latched in its retracted position is released so that it moves to its extended carrier body tilting position. The position of the plunger member also preferably controls a solenoid operating the latch member for the gate involved, and when the plunger member involved moves upwardly from its retracted position, the solenoid is operated to withdraw the latch member from behind the gate so the pressure of a guide roller moving against the inwardly spring urged gate can then push the gate open. A forwardly outwardly flaring stationary cam member is positioned adjacent the forward end of the gap covered by each gate member and the cam member receives the guide roller of the carrier body involved to continue increasing the angle of tilt of the carrier body as the carrier unit involved moves by the cam member until the angle of tilt of the carrier body increases beyond a minimum given value where the carrier body involved flips all the way over under its own weight. The plunger member is simply automatically returned to its retracted latched position by the force from a projecting portion at the rear end portion of a carrier unit which bears down upon the plunger member after it has accomplished its tilting function to press the same into its lowered retracted position where it is latched in position. From the construction just described, the plunger member does not have to operate against very large forces even though the carrier bodies may themselves be heavy and support heavy loads.

The above and other objects, advantages and features of the invention will become apparent upon making reference to the specification to follow, the claims and the drawings wherein:

Figure 4:
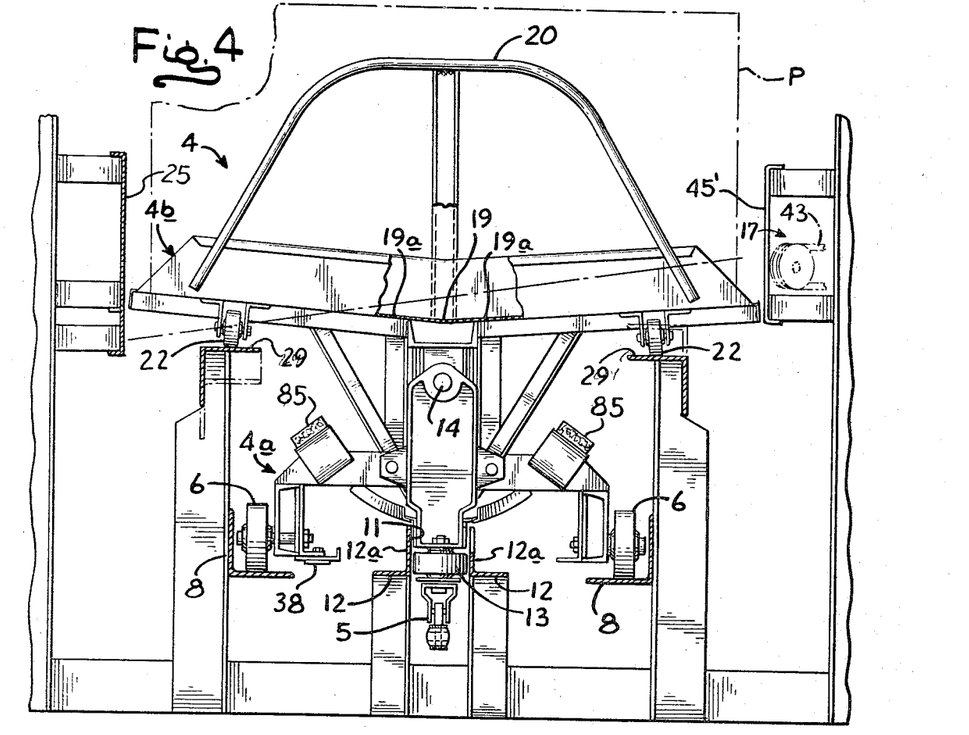
FIG. 4 is a transverse vertical sectional view through a portion of the conveyor system shown in FIG. 3 with a carrier unit riding thereon where the carrier body of the carrier unit is supported by auxiliary tracks or rails.
Figure 5:
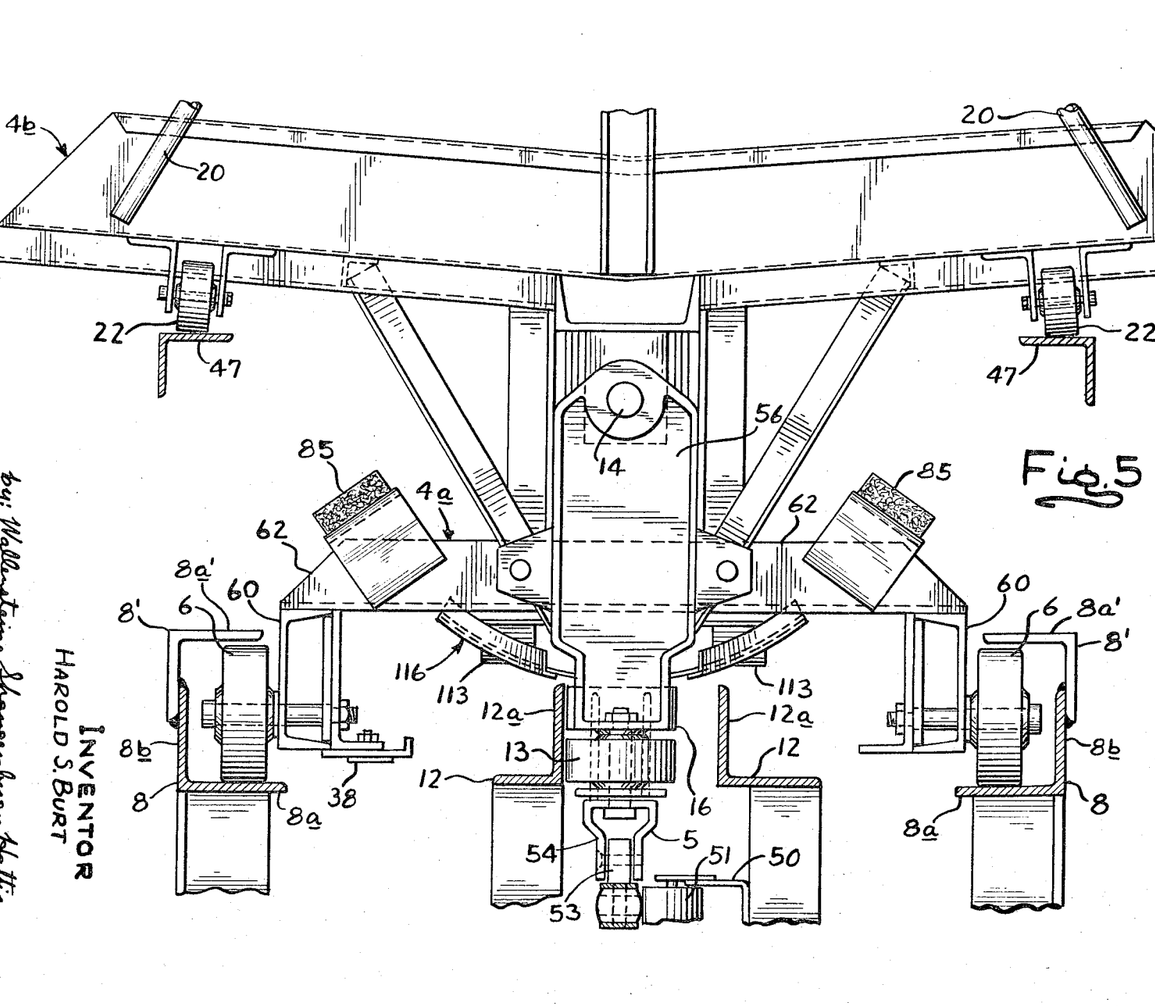
FIG. 5 is a front elevational view of a unit of the conveyor system with the tracks and guide channel on and in which it rides being shown in section, as a carrier unit riding on a downwardly inclining portion of the conveyor approaches a curved portion thereof shown in section.
Figure 6:
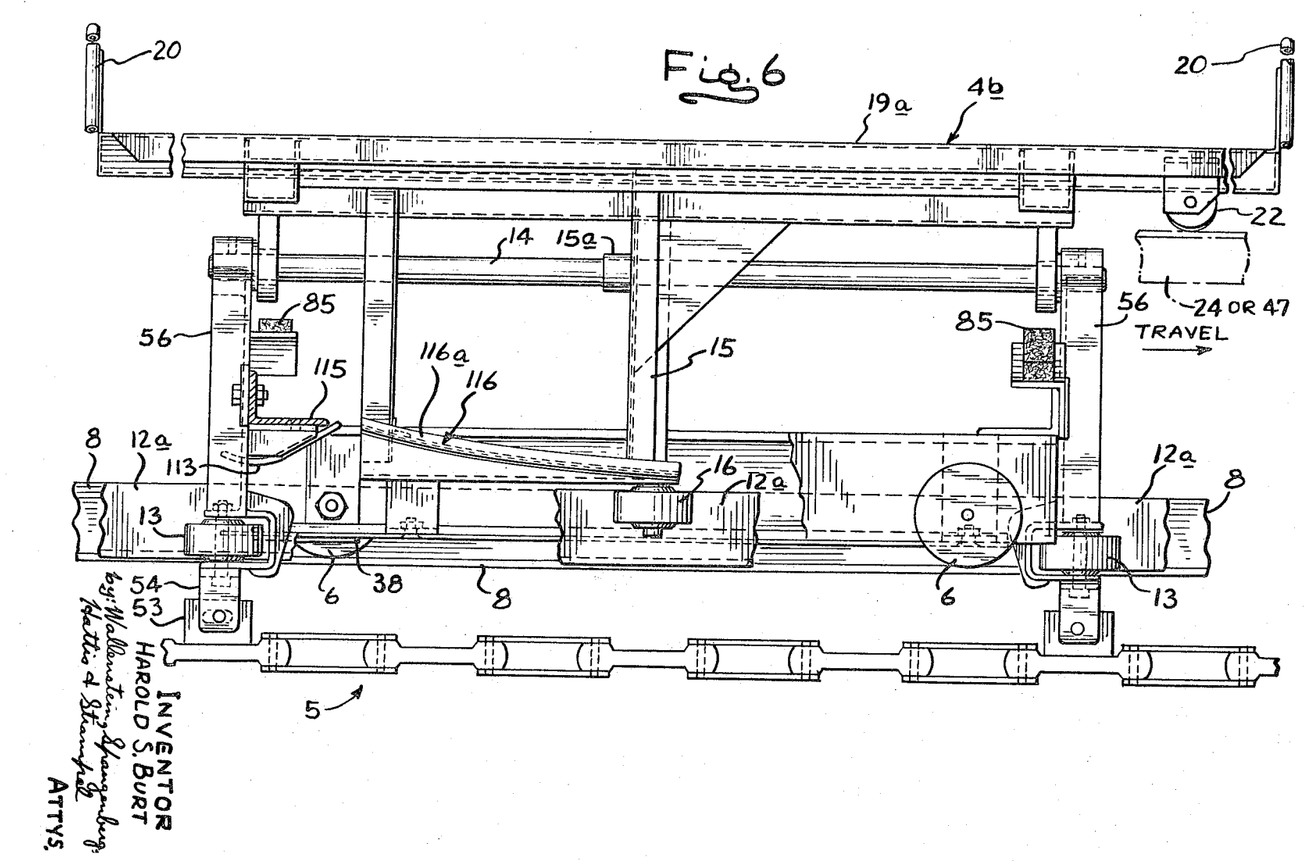
FIG. 6 is a side elevational view, partly broken away and of reduced scale, of the carrier unit shown in FIG. 5 with the tracks and guide channel on and in which it rides being shown in section.
Figure 7:
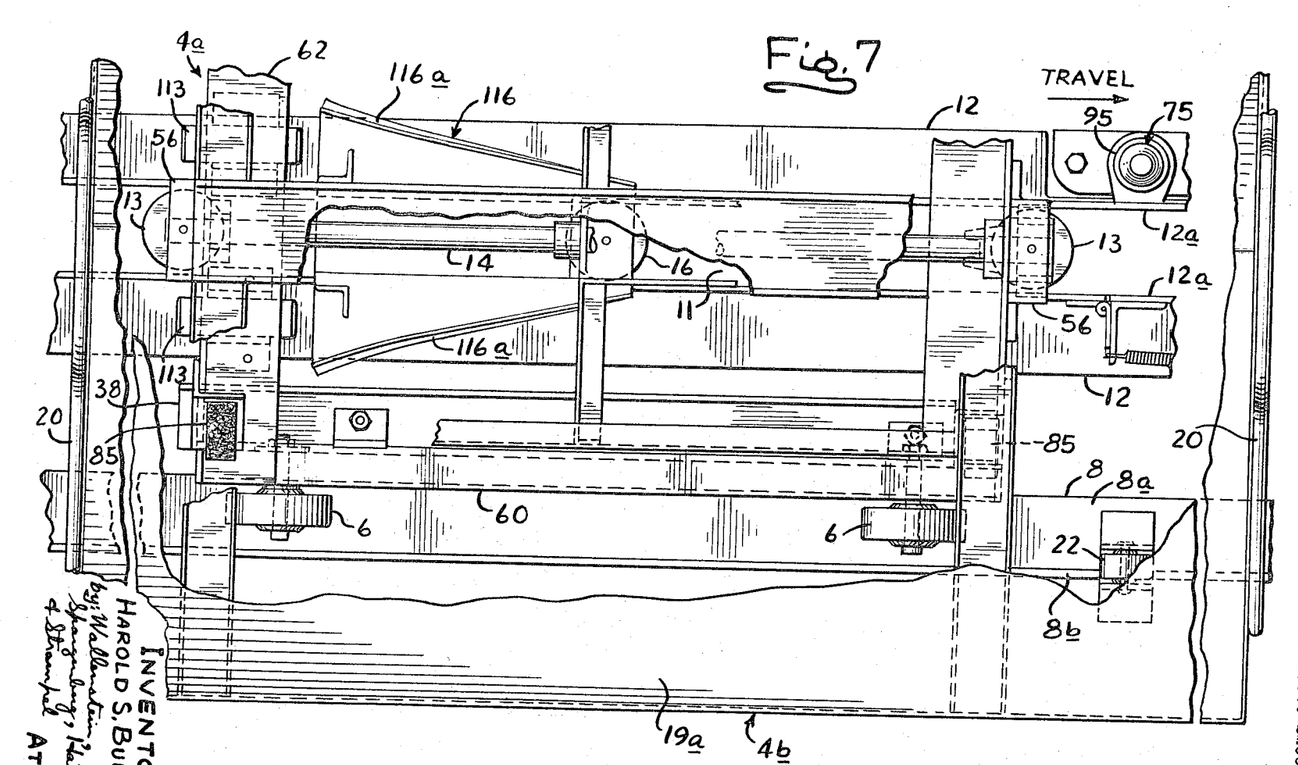
FIG. 7 is a fragmentary plan view of the carrier unit.

Referring now more particularly to FIGS. 1 through 8, the conveyor system shown therein is an endless conveyor system which has individual spaced carrier units 4 (FIG. 1) which are interconnected by a suitable impelling means preferably an endless chain 5 (FIGS. 4–6). Each of the carrier units has a base portion 4a with front and rear wheels 6 on each side thereof riding on the tops of laterally spaced tracks or rails 8—8 forming an endless path for the carrier units. The path of travel of the base portions of the carrier units is precisely determined by a vertical guide channel 11 positioned between the tracks 8—8 formed by spaced angle members 12—12 having laterally spaced vertical flanges or walls 12a—12a. The base portion of each carrier unit has centered front and rear horizontally oriented guide rollers 13—13 which ride between the walls 12a—12a of the guide channel.

Each carrier unit has a carrier body or tray 4b mounted for tilting movement about a longitudinally extending pivot axis formed by a pivot rod 14 supported beneath each tray. Each tray carries a depending arm 15 (FIG. 6) which may include bearing 15a which pivots around the rod 14, the arm 15 carrying on the bottom thereof a horizontally oriented guide roller or wheel 16 which rides between and is guided by the upper portion of the guide channel 11 where the tray is to remain in an untilted or horizontal position.

The tray 4b of each carrier unit is tilted in a manner to be explained. The tilting may take place at one or more loading stations 17 (FIG. 1) where the carrier units are tilted at a relatively small angle, and one or more discharge stations 18–1, 18–2, etc. where the carrier units are tilted at a substantial angle as shown in dashed lines in FIG. 8.

In the illustrated embodiment of the invention, each carrier unit tray 4b has a trough-shaped bottom wall 19 (FIG. 4) formed by intersecting, inclined, lateral wall portions 19a—19a, the outer margins of which are free of any upstanding walls so that a package P (FIGS. 1 and 4) readily can be slid onto or off either side of the tray by tilting the same to one side or another in the manner to be explained. The front and rear ends of the trays 4b have upstanding article retaining means, such as upwardly arcing abutment rods 20—20.

As previously indicated, as a carrier unit approaches a loading station 17 at which an article is to be loaded on the tray 4b thereof, the tray is tilted a small degree away from the loading station 17 as shown in dashed lines in FIG. 4. To this end, a pair of vertically oriented rollers 22—22 are supported immediately beneath the opposite sides of the front end of each tray 4b (FIGS. 4–6). To permit the tray to be tilted, the upper portion of the guide channel 11 in the vicinity of each loading station 17 is interrupted (FIG. 4) so that the guide roller of the tray is free to move out of the guide channel 11. The angle of the tray is controlled by a pair of tilt rails 24—24 (FIG. 1) which engage the bottom portions of the rollers 22—22 and extend to unequal elevations to tilt the tray a small angle away from the loading station where the inclined bottom wall portions 19a—19a of the tray will both slope down from the loading station 17. (The rails 24—24 return to the same elevation at a point past the loading station where the guide roller re-enters the guide channel 11.) A back-up wall 25 extends along the track 8 on the side thereof furthest from the loading station and prevents an article slid onto the raised side of the tilted tray nearest the loading stations 17 from rolling or sliding off the other lowered end of the tray.

The details of the loading station 17 are disclosed in the aforesaid application Serial No. 422,192. It should be understood that as far as the present invention is concerned, the loading station 17 can take a variety of forms. However, it is preferred that the loading station 17 be designed as disclosed in the aforesaid parent application wherein it includes a platform 28 to which articles are delivered by an inlet roller conveyor 26. The inlet roller conveyor 26 is continuously driven so that an article placed thereon will be impelled toward the platform 28, but the article is normally prevented for going onto the platform by a suitable inlet gate 30. An operator standing at a stationary elevated platform 32 next to the inlet roller conveyor may control the movement of articles onto the stationary platform 22 by a belt conveyor 34. To this end, a control panel 36 may be provided having a control button which operates the conveyor 34 and other controls which, among other things, determines the particular discharge station at which a particular article then on the loading station platform 28 may be discharged from the carrier unit onto which it will be loaded. The controls, for example, can control the magnetic pattern on a magnetic recording head generally indicated by reference numerals 37 in FIG. 1 which transfers the same code pattern onto a magnetic storage head 38 (FIG. 5) supported on the bottom of the framework of the base portion 4a of the carrier unit which is to receive the next article to be delivered from the loading station platform 28.

The outermost extremity of the loading platform 28 is preferably provided with a gate comprising a series of longitudinally spaced fingers 41. The loading station platform 28 has extending between the inlet roller conveyor 26 and the outlet end of the platform 28 many rows of rollers 42 which guide an article delivered to the platform 28 against the gate forming fingers 41. A series of parallel belts 43 are provided extending at a 45 degree angle pointed in the direction of movement of the carrier units past the loading station. The belts 43 pass between the rollers 42, and the upper section of the belts are positioned in a common horizontal plane normally positioned somewhat below the plane of the upper extremities of the rollers 42. When it is desired to impel an article from the loading station platform 28 onto a carrier unit 4, the gate-forming fingers 41 and the rollers 42 are lowered to drop the article on the platform 28 upon the conveyor belts 43 moving toward the discharge end of the loading station platform where it is moved onto a moving carrier unit. The conveyor belts are operated at such a speed that the component of movement thereof parallel to the direction of movement of the carrier unit by the loading station is equal to the velocity of movement of the carrier units thereby, so that an article is impelled upon a carrier unit with little or no shock. The end of the loading station platform 28 is at or slightly above the elevation of the raised part of the slightly tilted tray passing by the loading station, so that the article moves to the carrier unit tray and slides by force of gravity into a generally centered position where the outer end of the article involved, such as the box P or the like, rests against the back-up wall 25 (FIG. 4).

The timing of the raising and lowering of the gates 30 and 41 and the rollers 42 are automatically controlled by photocells (or some other automatic means) as disclosed in the aforesaid application Serial No. 422,192. Since the details of the loading operation form no part of the present invention, a further description thereof will not be made in this application.

Figures 1, 14:
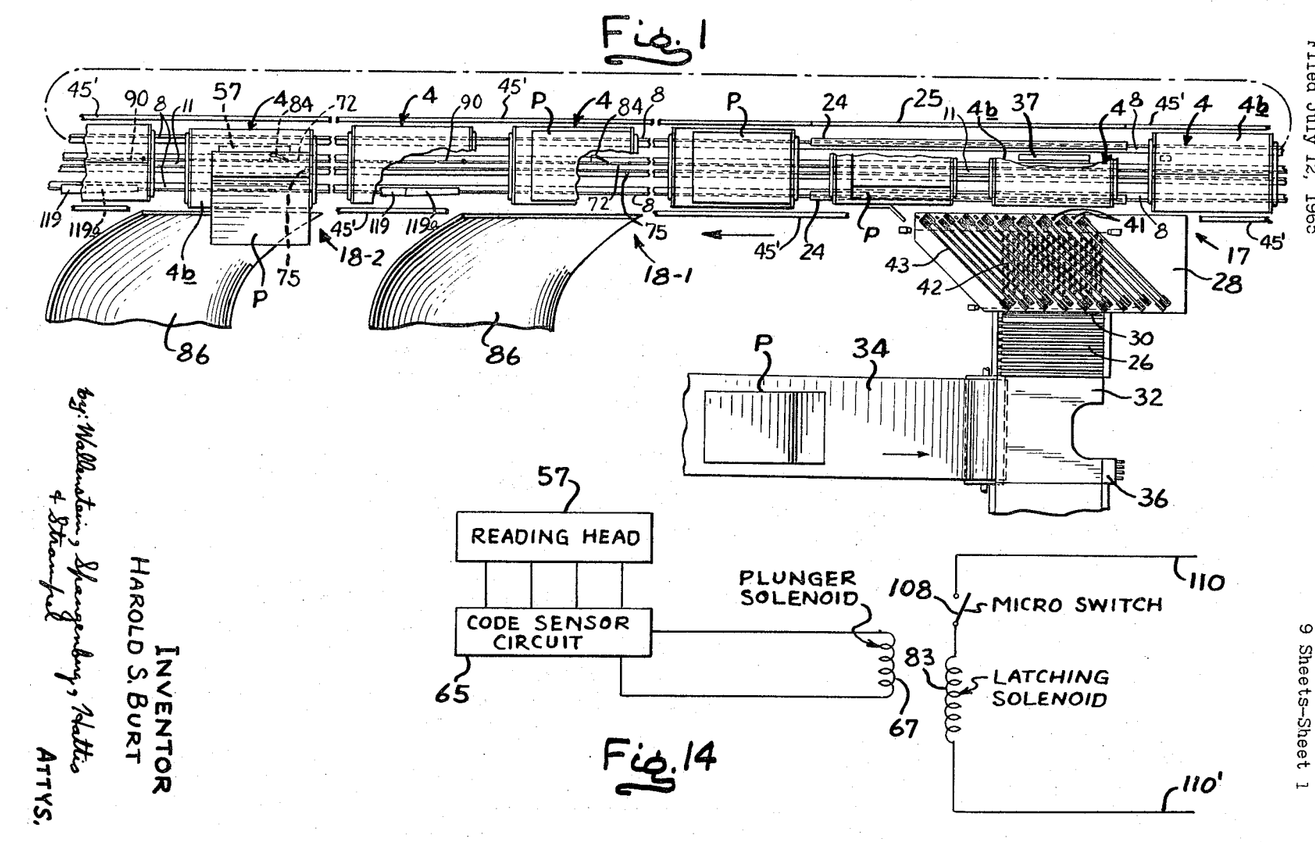
FIG. 1 is a fragmentary plan view of portion of the conveyor system incorporating features of the present invention, and shows, among other things, a loading station and two discharge stations.
FIG. 14 is a simplified diagram of the control circuitry operating the solenoids which control the plunger and gate latching members appearing in FIGS. 10–13.

When a carrier unit goes around a curved section of the conveyor system, certain problems present themselves which are overcome by certain aspects of the present invention. In the first place, the centrifugal force of the fast moving carrier units may cause the article P to slide off the sides of the trays. To prevent this result, curved back-up rail sections 45 (FIGS. 2-3) are provided on the outer sides of the curves involved adjacent the path of travel of the sides of the trays of the carrier units, so that the articles are kept in place on the tray around each curve. In many cases, it is desirable to keep the articles from falling off the trays along the entire path of the conveyor system by back-up rails 45' extending for practically the full length of both sides of the endless path of the conveyor system as shown in FIGS. 1 through 3, except at the points where articles are to be discharged from or loaded onto the trays.

Although the guide rollers 13—13 of the base portion of each carrier unit 4 and the guide roller 16 of the tray thereof are in alignment within the guide channel 11 along the straight portions of the endless path of the conveyor system, the guide roller 16 cannot remain in alignment with the associated guide rollers 13—13 around each curve of the conveyor system. Thus, as shown in FIG. 3, a guide roller 16 of carrier unit 4 must move inwardly of a line between the guide rollers 13—13 around a curve. Accordingly, to enable the guide roller 13 to move inwardly of the latter line around each curve, the inner wall 12a of the guide channel is moved inwardly (or interrupted) to provide a clearance space for inward movement of the guide roller 16 of each tray 4b. The guide rollers 13—13 may still engage the outer wall 12a of the guide channel. To prevent each tray from shifting laterally as the carrier unit involved goes around a curve, auxiliary means are provided for maintaining the horizontal stability of each tray. This auxiliary means includes rails 47—47 (FIG. 2) which engage the bottom portions of the rollers 22—22 extending from each tray.

The chain 5 needs to be guided around each curve of the conveyor system, and, to this end, a bracket 50 (FIG. 5) supports a series of chain guiding rollers 51 on the inside of the curve involved, around which rollers the links of the chain 5 pass around the curve. As best illustrated in FIGS. 5 and 6, the chain 5 is connected to each end of the base portion of each carrier unit by a plate 53 secured by a lost motion connection between the wings of a bifurcated link 54 attached to an adjacent end wall 56 of the carrier unit. The pivot rod 14 is connected between the upper ends of the end walls 56—56. The wheel 6 at each end and side of the carrier unit is rotatably supported on the depending portion 60 (FIG. 5) of a cross member 62 anchored to the side of the adjacent end wall 56.

Figures 2, 3:
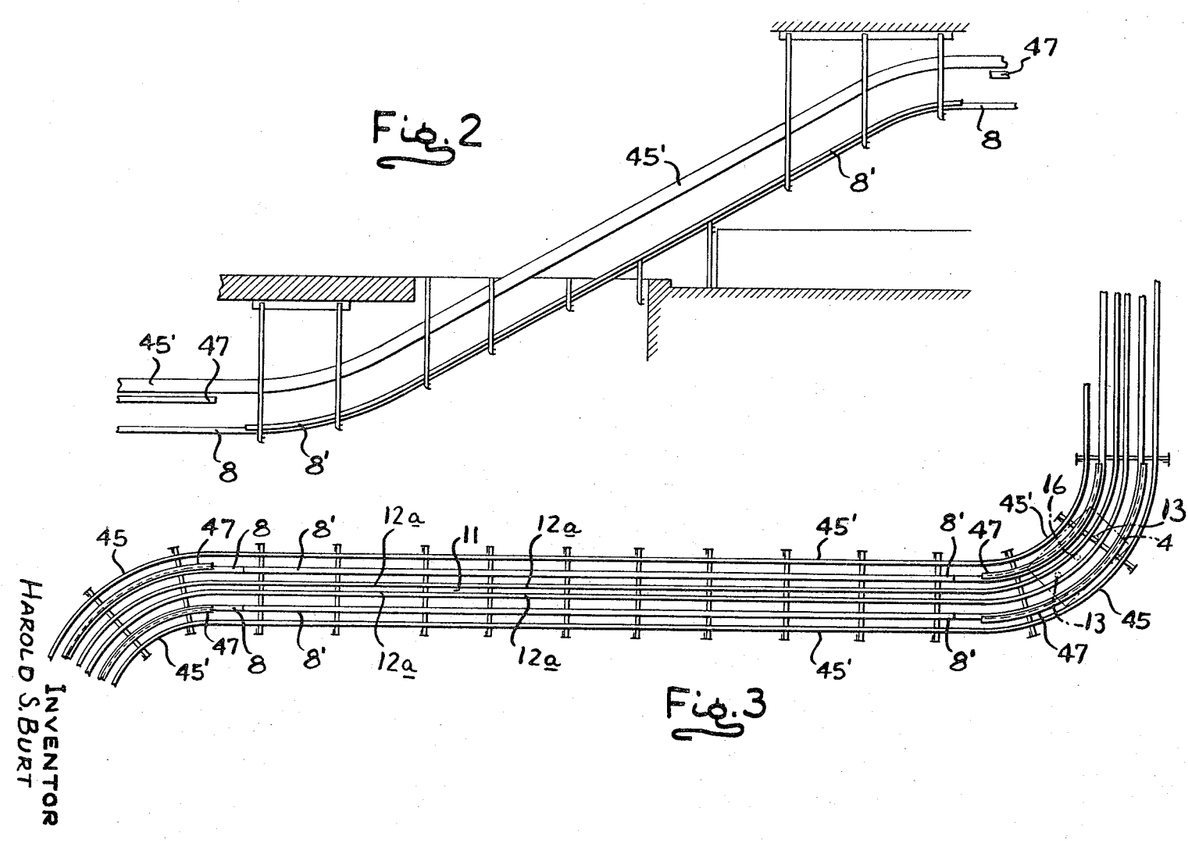
FIG. 2 is an elevational view of the portion of the conveyor system of FIG. 1 where the conveyor system extends between two different levels.
FIG. 3 is a plan view of the portion of the conveyor system shown in FIG. 2.

As previously indicated and illustrated in FIGS. 2 and 3, the conveyor system of the present invention is adapted to convey the carrier units along inclined track sections which extend between different levels or stories of a building or the like. When a carrier unit goes from a horizontal section of a track to an upwardly inclined section thereof, particularly at high speeds, the carrier unit may strike the inclined portions of the tracks and bounce off the tracks, placing severe forces on the chain and carrier units, and also on the articles carried by the carrier units. Also, when a carrier unit moving up an inclined section of the tracks and reaches a horizontal section thereof, or when a carrier unit moving on a horizontal section thereof enters depending portions of the tracks, the inertia of the carrier units could cause the carrier units to leave the tracks. To overcome the problems just referred to, carrier unit hold-down means to be described are provided at the ends of the inclined sections of the tracks to keep the carrier units moving on the tracks in a smooth regular path.

Figures 8, 11:
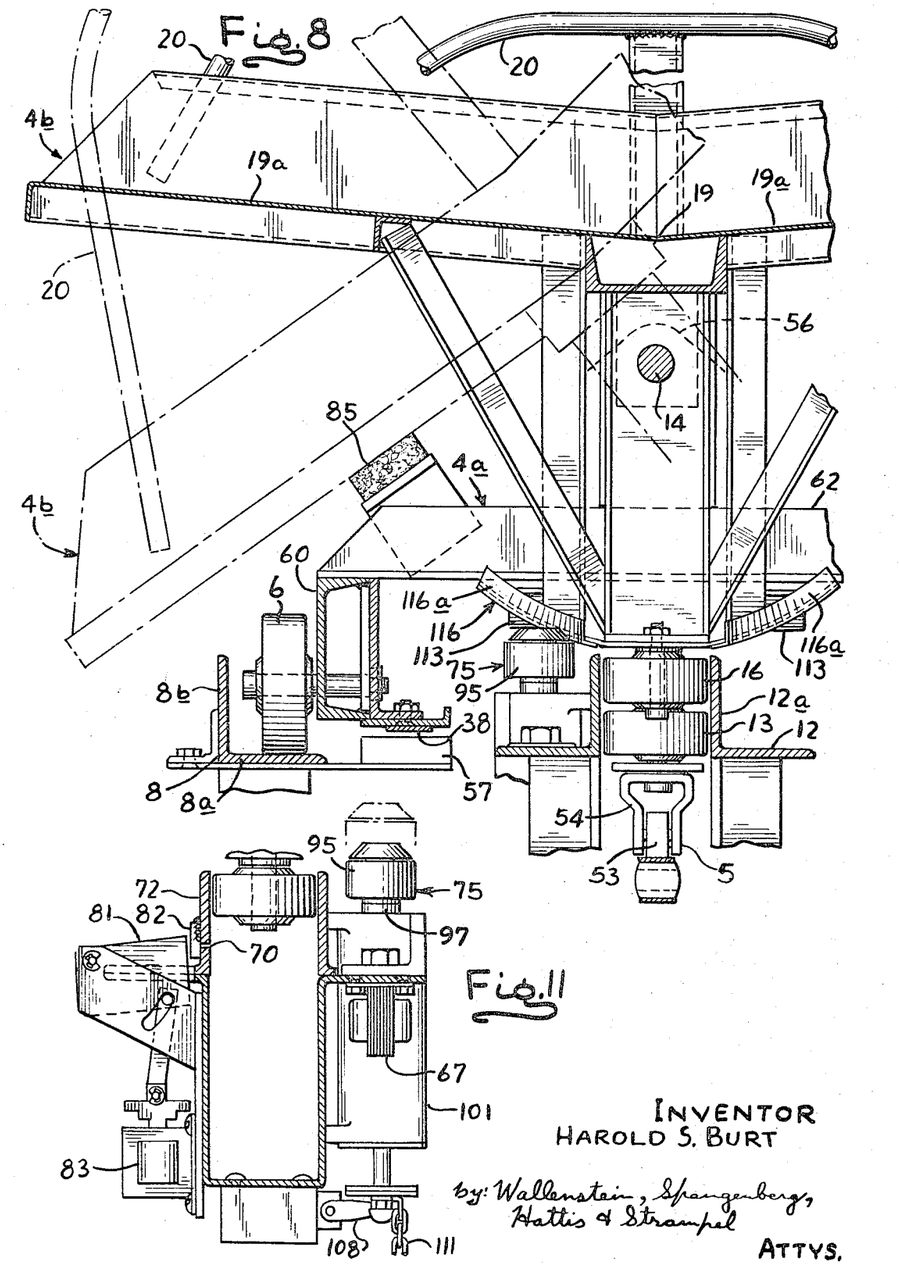
FIG. 8 is a fragmentary rear view of a carrier unit with the tracks and guide channel on and in which it rides being shown in section, and in dashed lines the carrier body is shown in a fully tilted position where it discharges the contents thereof.
FIG. 11 is a transverse section through FIG. 10, taken substantially along the section line 11—11 therein.

As perhaps best shown in FIG. 8, the tracks 8—8 along the straight sections of the path of the conveyor system are angle members having a horizontal flange 8a forming the track or rail and a vertical flange 8b on the outside of the carrier unit wheels 6. The carrier unit hold-down means comprises inverted angle members 8'—8' (FIGS. 2 and 5) welded or otherwise secured to the angle member 8—8 along the inclined sections of the tracks to form top enclosures for the tracks. The horizontal flange 8a' of each angle member closely overlying the upper portion of the wheels 6 of the carrier units, so as to prevent the same from moving an appreciable distance from the tracks 8—8. The carrier unit hold-down members are utilized for the entire length of the inclined sections of the tracks to overcome the carrier lifting forces applied by the chain 5 due to the tendency of the chain to occupy the smallest distance between the hump and depression of the curves at the end of each incline. The carrier lifting forces can be overcome by utilizing a separate guide for the chain but the use of the inverted angle members 8'—8' over the tracks 8—8 make the use of a chain guide unnecessary at this point.

When a carrier unit reaches a discharge station at which the contents thereof are to be discharged, the tray 4b of the carrier unit is tilted all the way over as shown in FIG. 8. As previously indicated, the discharge station at which the contents of a particular carrier unit are to be discharged in the illustrated embodiment of the invention is determined by the magnetic code recorded on the magnetic storage head 38 thereof. A magnetic reading head 57 which may comprise a number of pick-up coils or the like is positioned opposite each discharge station to be passed over in close proximity by the storage head 38 of each carrier unit. If the combination of magnetic areas constituting the code detected by the magnetic reading head 57 corresponds to the code assigned to the discharge station involved, a code sensing circuit 65 (see FIG. 14) operates to energize a plunger solenoid 67 assigned to the discharge station which raises a plunger member 75 (FIGS. 1 and 9-11) to effect a tilting operation in a manner to be described.

To tilt the tray all the way over, it is necessary for the guide roller 16 of each carrier unit riding in the guide channel 11 to leave the guide channel. To this end, as best shown in FIGS. 9 and 11 through 13, the guide wall 12a furtherest from the side of the tracks on which the discharge station is located is interrupted to provide a gap 70. The gap 70 is normally closed by a discharge gate 72 which is a wall forming a continuation of the guide wall 12a. The discharge gate 72 is hinged to the rear end of the gap 70, that is the end of the gap which is first reached by the tray guide roller 16. The discharge gate 72 is normally urged in a closed position by a coil spring 74 extending between a stationary bracket member 76 and a wing 78 attached to the discharge gate 72. The gate 72 can move only outwardly of the guide channel where the spring 74 is placed under tension. Normally, the gate 72 is held securely in a closed position by a latching plate 81 which is mounted for movement between a lower gate latching position shown in FIG. 10 and an upper gate unlatching position shown in dashed lines in FIG. 10. The latching block 81 engages an abutment tab 82 attached to the gate 72 to prevent the gate from swinging outward when the latching plate is in its upper position. The abutment tab 82 acts as a stop for preventing the gate from swinging inward.

Figure 9:
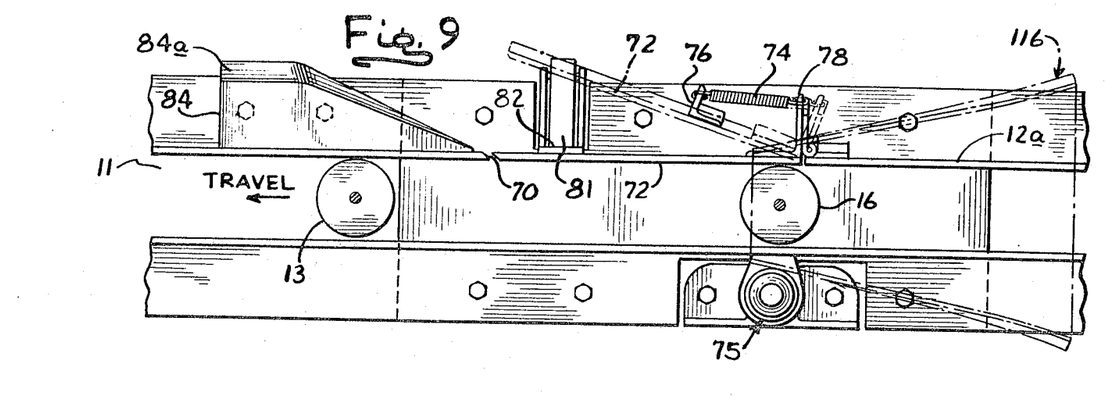
FIG. 9 is a plan view of the guide channel and the gate, cam and plunger members associated therewith in the vicinity of the discharge station which operates to effect tilting of the carrier body of a carrier unit thereat.
Figure 10:
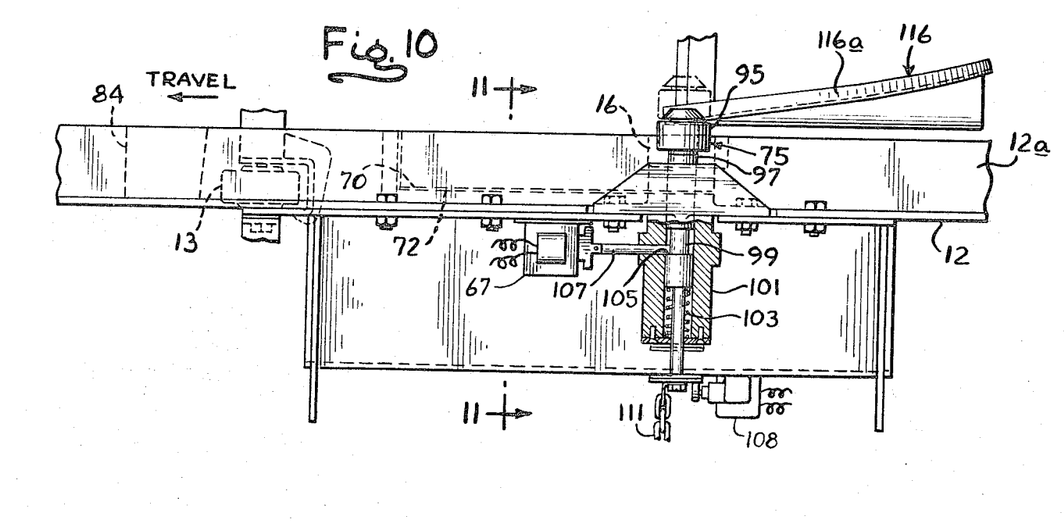
FIG. 10 is a side elevational view, partly broken away, of the portion of the conveyor system shown in FIG. 9.
Figure 12:
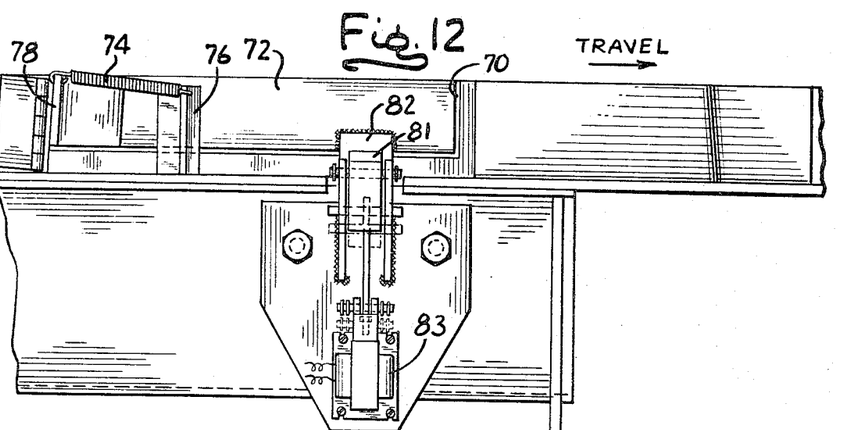
FIG. 12 is a side elevation of the portion of the conveyor system shown in FIGS. 8–10, taken on the opposite side of the guide channel from that shown in FIG. 9.

The up and down movement of the latching block 81 is controlled by a solenoid 73 which, when energized, pulls the latching block 81 down and, when deenergized, returns the latching block 81 to its upper position. When a tray is tilted into a discharging position, the plunger solenoid 67 and the latching solenoid 82 are energized and, when tilted to a relatively small angle, the tray guide roller 16 will apply an outward pressure against the then unlatched gate which moves outwardly a small distance limited by its abutment with the bracket 76 (FIG. 9). This leaves sufficient clearance for movement of the guide roller 16 out of the guide channel 11. The weight of the tray, which for small angles of tilt opposes the outward movement of the tray, brings the guide roller against the side of a cam member 84 having a cam surface 84a angled to be engaged by the inclined flat side of the guide roller 16. The cam surface 84a flares outwardly in a forward direction and at its widest point will bring the center of gravity of the tray to a point where the tray will flip all the way over under the force of gravity into the position shown in FIG. 8 where it comes to rest on a pair of support pads 85—85 attached to the base portion of the carrier unit, one such pair being located on each side of the carrier unit. As soon as the roller 16 passes by the rear edge of the cam surface 84a, the gate 83 is returned by the force of the spring 74 to its closed position. In the manner to be explained, the latching block 81 will then move upwardly to once again hold the gate 72 in its gap-closing position.

Figure 15:
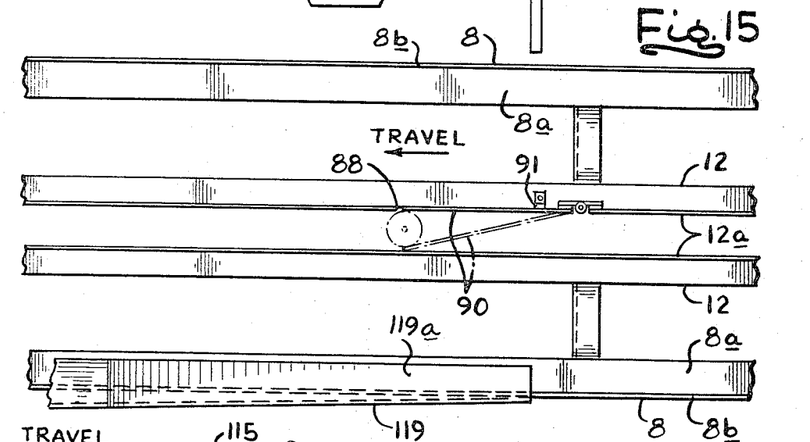
FIG. 15 is a plan view of the conveyor system at a point just beyond a discharge station.

The contents of each tray discharges into a suitably shaped receiving chute 86 shown in FIG. 1 and then the tray involved is uprighted to return the guide roller 16 thereof to the guide channel 11 in a manner to be described. The return of the guide roller 16 to the guide channel 11 is made possible by the provision of a second gap 88 (FIG. 15) in one of the guide walls 12a preferably at a point beyond each discharge station. The gap 88 is normally closed by a return gate 90 which is hinged at the rear end of the gap 88. The return gate 90 is adapted to move only inwardly into the channel under the force of the guide roller 16. An abutment block 91 on a guide wall 16a near the hinge of the gate 90 prevents the gate from swinging outward. Unlike the discharge gate 62, the return gate 90 is not under any spring tension and is closed by the rear guide roller 13 of the base portion of the carrier unit involved as it moves by the gate 90.

In the preferred form of the invention, the means for initially tilting each tray opposite each discharge station to the degree necessary to carry the guide rollers 16 thereof out of the guide channel includes the aforesaid plunger member 75. Plunger member 75 preferably includes a horizontally oriented roller 95 which rotates about a vertical axis on the end of a plunger stem 97 having a reduced portion 99 mounted within a cylinder 101. A spring 103 mounted in the bottom of the cylinder 101 urges the stem 97 upwardly so that a shoulder 105 formed by the reduced portion 99 of the stem abuts against a latch bar 107 whose position is controlled by the aforementioned plunger solenoid 67. When the solenoid 67 is deenergized, the latch bar 107 is urged to its extended position where it abuts the shoulder 105 of the plunger stem 97 to hold the plunger member in a lowered retracted position. When the solenoid 67 is momentarily energized, the plunger 107 is withdrawn partially from the cylinder 101, permitting the spring 103 to push the plunger stem 97 upwardly where the plunger member assumes an upper carrier tilting position. The bottom of the plunger stem 97 operates a microswitch 108. The microswitch is closed when the plunger stem 97 moves from its lowermost position and is open when the plunger stem is in its lowermost position.

As shown in FIG. 14, the micro-switch 108 connects the voltage on power lines 110-110' to the aforementioned latching solenoid 83 which controls the position of the latching block 81. Thus, when the plunger member is in its retracted position, the latching solenoid 83 is deenergized enabling the latching block 81 to assume a normally upwardly spring urged latching position. As soon as the plunger member moves from its lowermost position, the microswitch 101 closes to energize the latching solenoid 83 which retracts the latching block 81 from the path of movement of the discharge gate 72.

Figure 13:
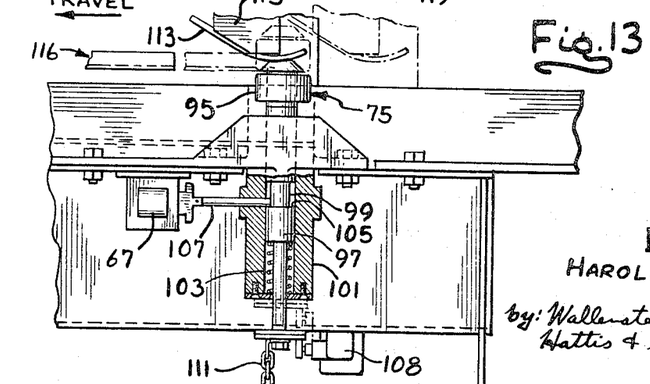
FIG. 13 is a side elevational view of the portion of the conveyor system shown in FIGS. 8–12 showing the plunger member being reset to a retracted position.

To provide for a manual reset of the plunger member, a pull-chain 111 is connected to the bottom of the plunger stem 97 so that the plunger member can be manually returned to its bottommost position. The plunger member is normally reset automatically by a plunger depressing cam 113 which is a downwardly and rearwardly inclining member (FIG. 6) supported on a bracket 115 connected to the rear end wall 56 of the frame of the base portion of each carrier unit. As a carrier unit moves by a raised plunger member 75, the plunger depressing cam 133 will depress a raised plunger member into its retracted position. To facilitate the smooth engagement of each plunger depressing cam 113 with plunger member 75, the upper end portion of each plunger member is provided with a rounded or tapered shape and the forward end of the plunger depressing cam 113 is curved upwardly, as best shown in FIG. 13.

Each carrier unit has a cam shell 116 having a rearwardly outwardly flaring cam surface 116a on each side of the centered pivot axis of the tray thereof. Each plunger member 75 is placed on the side of the center line of the path of travel of the carrier units nearest the discharge station involved and, in the raised position of each plunger member 75, one of the rearwardly outwardly flaring plunger engaging surfaces 116a is engaged thereby progressively to lower the side of the tray nearest the discharge station, thereby tilting the tray to bring the guide roller 16 thereof out of the guide channel 11 in the manner explained above.

Figure 16:
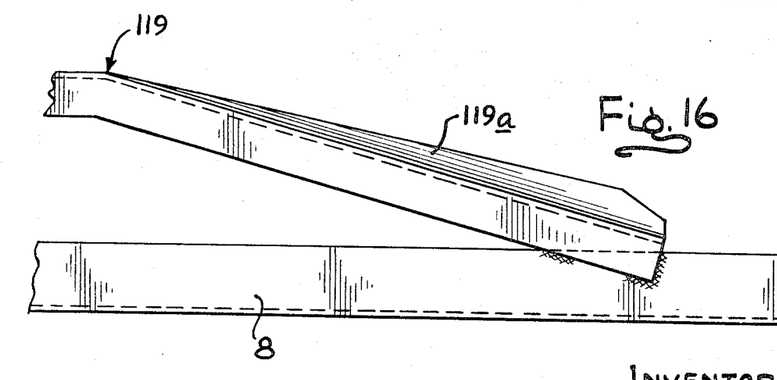
FIG. 16 is an enlarged elevational view of the carrier body uprighting cam positioned at the portion of a conveyor system shown in FIG. 15.

The tilting force which returns a tilted tray beyond each discharge station to an upright position includes a cam track 119 (FIGS. 15 and 16) which engages the tray roller 22 on the lowered side of a tilted tray, and, by means of an upwardly inclined portion 119a of the cam track, gradually raises the lowered portion of the tray until the guide roller 16 thereof enters the guide channel once more by pushing the return gate 90 inwardly as previously indicated.

The present invention provides an exceedingly simple and reliable conveyor system wherein the carrier units can be operated at a substantial speed and carry substantial weights around curved and upon inclined sections thereof, and heavy trays readily can be tilted and returned to an upright position without difficulty or timing problems.

It should be understood that numerous modifications may be made in the preferred form of the invention described above without deviating from the broader aspects of the invention.

I claim:

1. In combination, a carrier unit for carrying a load past a number of discharge stations, said carrier unit having a carrier body mounted for tilting movement about a longitudinal pivot axis extending in the direction of movement of the carrier unit, the carrier body when tilted beyond a given angle to one side of the vertical discharging the contents thereof, and means for maintaining the carrier body substantially horizontal between discharge stations and tilting the same about said longitudinal axis beyond said given angle at a selected discharge station to discharge the contents thereof, said means comprising: a guide channel formed by laterally spaced guide walls extending over the intended path of travel of said carrier unit past said discharge stations; guide means on each carrier body, said guide means riding between and guided by said guide walls, the carrier body being untilted when said guide means is in said guide channel and tilted when said guide means leave the guide channel; said guide walls being interrupted opposite each discharge station at a first location to leave a first gap thereat through which the guide means can leave the guide channel to effect tilting of the carrier body and interrupted at a second location to form a second gap into which the guide means returns to the guide channel; a first gate member closing each of said first gaps in the guide channel and movable outwardly of the guide channel, and a second gate member closing the second gap in the guide channel and movable inwardly of the guide channel, means adjacent each discharge station selectively movable into a first position which effects movement of said guide means outwardly and opening of the first gate member thereat, to tilt the carrier body beyond said given angle, the first gate member subsequently being returned to its gap closing position; and means for uprighting a tilting carrier body to move the guide means thereof inwardly and to open said gate member to return the guide means to the guide channel.

2. The combination of claim 1 wherein said means adjacent each discharge station selectively movable into a position where it tilts the carrier body comprises a vertically movable plunger member having a retracted and an extended position, cam means on the carrier body having a rearwardly flaring horizontal profile, the front of said cam means being engaged by the plunger member in its extended position and the carrier body is in its untilted position, the plunger member riding on the flaring sides of the cam means which thereby progressively tilts the carrier body to an increasing degree as the carrier unit moves forwardly past the plunger member, and means associated with each plunger member for operating the same to its extended position.

3. The combination of claim 2 wherein the carrier unit has a plunger resetting means which returns an extended plunger means to its retracted position as the tilted carrier body moves past the plunger member.

4. The combination of claim 1 wherein said means adjacent each discharge station selectively movable into a position where it tilts the carrier body comprises a plunger member which has a carrier body tilting extended position and an inoperative retracted position, spring means urging each plunger member into its extended position, plunger latching means for normally automatically holding each plunger member in its retracted position, means for releasing a selected plunger latching means to permit the associated plunger member to move under spring pressure to its extended position, and means responsive to the passage of the tilted carrier body past the plunger member for returning an extended plunger member to its retracted position.

5. The combination of claim 1 wherein said means adjacent each discharge station selectively movable into a position where it tilts the carrier body comprises a plunger member which has a carrier body tilting extended position and an inoperative retracted position, spring means urging each plunger member into its extended position, plunger latching means for normally automatically holding each plunger member in its retracted position where the plunger member is moved to its retracted position, means for momentarily releasing a selected plunger latching means to permit the associated plunger member to move under spring pressure to its extended position, and means on the carrier unit responsive to the passage of the tilted carrier body past the plunger member for returning an extended plunger member to its retracted position.

6. In combination, a carrier unit for carrying a load past a number of discharge stations, said carrier unit having a carrier body mounted for tilting movement about a longitudinal pivot axis extending in the direction of movement of the carrier unit, the carrier body when tilted beyond a given angle to one side of the vertical discharging the contents thereof, and means for maintaining the carrier body substantially horizontal between discharge stations and tilting the same about said longitudinal axis beyond said given angle at a selected discharge station to discharge the contents thereof, said means comprising: a guide channel formed by laterally spaced guide walls extending over the intended path of travel of said carrier unit past said discharge stations; guide means on each carrier body, said guide means riding between and guided by said guide walls, the carrier body being untilted when said guide means is in said guide channel and tilted when said guide means leave the guide channel at an angle which increases with the distance the guide means is spaced from the guide channel; said guide walls being interrupted opposite each discharge station at a first location to leave a first gap thereat through which the guide means can leave the guide channel to effect tilting of the carrier body and interrupted at a second location to form a second gap into which the guide means returns to the guide channel; a first latched gate member closing each of said first gaps in the guide channel and movable when unlatched outwardly of the guide channel means, and a second gate member closing the second gap in the guide channel and movable only inwardly of the guide channel under the lateral pressure of the guide means, gate latching means opposite each first gate member for normally holding the same closed; means adjacent each discharge station selectively movable into a first position which effects unlatching of the gate latching means of the associated first gate member involved to permit the opening thereof and movement of said guide means outwardly, against the first gate member thereat to tilt the carrier body, the first gate member involved returning to its gap closing position under spring pressure where said gate latching means again operates to hold said first gate member closed, and means for uprighting a tilted carrier body to move the guide means thereof inwardly to open said second gate member to return the guide means to the guide channel.

7. The combination of claim 6 wherein said means adjacent each discharge station selectively movable into a position where it tilts the carrier body comprises a plunger member which has a carrier body tilting extended position and a retracted position, spring means urging each plunger member into its extended position, plunger latching means for normally holding each plunger member in its retracted position; means for selectively releasing any plunger latching means to permit the associated plunger member to move under spring pressure to its extended position, means for returning an extended plunger member to its retracted position as the tilted carrier body moves past the plunger member, means associated with each plunger movable for rendering the adjacent gate latching means ineffective to hold the associated gate member closed when the plunger member is moved from its retracted position, and means for disabling the operation of each gate latching means as long as the associated plunger member is out of its retracted position.

8. The combination of claim 6 wherein said means adjacent each discharge station selectively movable into a position where it tilts the carrier body comprises a plunger member which has a carrier body tilting extended position and is in an inoperative retracted position, spring means urging each plunger member into its extended position, plunger latching means for normally automatically holding each plunger member in its retracted position when the plunger member is moved to its retracted position, means for selectively momentarily releasing any plunger latching means to permit the associated plunger member to move under spring pressure to its extended position, means on the carrier unit for returning an extended plunger member to its retracted position as the tilted carrier body moves past the plunger member, means associated with each plunger member for rendering the adjacent gate latching means ineffective to hold the associated gate member closed when the plunger member is moved from its retracted position, and means for disabling the operation of each gate latching means as long as the associated plunger member is out of its retracted position.

9. In combination, a carrier unit for carrying a load past a number of discharge stations, said carrier unit having a carrier body mounted for tilting movement about a longitudinal pivot axis extending in the direction of movement of the carrier unit, the carrier body when tilted beyond a given angle discharging the contents thereof, and means for tilting the same about said longitudinal axis beyond said given angle at a selected discharge station to discharge the contents thereof, said means comprising a plunger member adjacent each discharge station which has an extended position where it engages a part of the carrier body and tilts the same, and an inoperative retracted position, spring means urging each plunger member into its extended position, plunger latching means for normally holding each plunger member in its retracted position, means for selectively releasing any plunger latching means to permit the associated plunger member to move under spring pressure to its extended position, and means responsive to the passage of the tilted carrier by the plunger member for returning an extended plunger member to its retracted position.

10. In combination, a carrier unit for carrying a load past a number of discharge stations, said carrier unit having a carrier body mounted for tilting movement about a longitudinal pivot axis extending in the direction of movement of the carrier unit, the carrier body when tilted beyond a given angle discharging the contents thereof, and means for tilting the same about said longitudinal axis beyond said given angle at a selected discharge station to discharge the contents thereof, said means comprising a plunger member adjacent each discharge station which has an extended position where it engages a part of the carrier body and tilts the same, and an inoperative retracted position, spring means urging each plunger member into its extended position, plunger latching means for normally holding each plunger member in its retracted position, when the plunger member is moved to its retracted position, means for selectively momentarily releasing any plunger latching means to permit the associated plunger member to move under spring pressure to its extended position, and means on the carrier unit for returning an extended plunger member to its retracted position as the tilted carrier body moves past the plunger member.

11. In combination, a carrier unit for carrying a load past a number of discharge stations, said carrier unit having a carrier body mounted for tilting movement about a longitudinal pivot axis, a guide channel formed by laterally spaced guide walls beneath the path of travel of the carrier unit, said tiltable carrier body having a guide roller positioned below the pivot axis of the carrier body and positioned between and guided by said vertical guide walls, the carrier body being untilted when the guide roller of the carrier body is in said guide channel and tilted when the guide roller leaves the guide channel to discharge the contents thereof, said guide walls being interrupted at a first location opposite each discharge station to leave a first gap thereat through which the guide roller of the carrier body can leave the guide channel to effect tilting of the carrier body, and interrupted at a second location to form a second gap into which the guide roller of the carrier body returns to the guide channel, a first gate member closing each first gap in the guide channel and movable outwardly of the channel, and a second gate member closing the second gap in the guide channel and movable inwardly of the channel means adjacent each discharge station, means selectively movable into a position for applying a tilting pressure to the carrier body to move the guide roller of the carrier body outwardly and to open the first gate to permit the guide roller to move outside of the guide channel and effect tilting of the carrier body, and means for uprighting the carrier body to move the guide roller thereof inwardly and to open said second gate member to return the guide roller of the guide carrier body to the guide channel.

12. In combination, a carrier unit for carrying a load past a number of discharge stations, said carrier unit having a base portion with rollers on the side thereof at the front and rear portion thereof, tracks on which said vertical rollers ride over an endless path passing by said discharge stations, the base portion of the carrier unit also having front and rear guide rollers between the sides thereof, said carrier unit having a carrier body mounted for tilting movement about a longitudinal pivot axis, a guide channel formed by laterally spaced guide walls extending between said tracks and beneath the path of travel of the carrier unit, said guide rollers of the base portion of the carrier unit being positioned between and guided by the bottom portion of said vertical guide walls, said tiltable carrier body having a guide roller positioned below the pivot axis of the carrier body and positioned between and guided by the upper portion of said vertical guide walls, the carrier body being untilted when the guide roller of the carrier body is in said guide channel and tilted when the guide roller leaves the guide channel to discharge the contents thereof, said guide walls being interrupted at a first location opposite each discharge station to leave a first gap thereat through which the guide roller of the carrier body can leave the guide channel to effect tilting of the carrier body, and interrupted at a second location to form a second gap into which the guide roller of the carrier body returns to the guide channel, a first gate member closing each first gap in the guide channel and movable outwardly of the channel, and a second gate member closing the second gap in the guide channel and movable inwardly of the guide walls, means adjacent each discharge station, means selectively movable into a position for applying a tilting pressure to the carrier body to move the guide roller of the carrier body outwardly and to open the first gate to permit the guide roller to move outside of the guide channel and effect tilting of the carrier body, and means responsive to the passage of the tilted carrier by the plunger member for uprighting the carrier body to move the guide roller thereof inwardly and to open said second gate member to return the guide roller of the guide carrier body to the guide channel.

13. A conveyor system comprising: a series of interconnected, longitudinally spaced carrier units, means for moving said interconnected carrier units in an endless path and in succession past one or more loading stations and one or more discharge stations, said endless path including rounded corner sections interconnecting straight sections of the path, each of the carrier units having a base portion having supported thereon a carrier body mounted for tilting movement relative thereto about a longitudinal pivot axis, guide means for containing the carrier units to move along the desired endless path and for normally maintaining the carrier bodies of the carrier units in a non-tilted position, said guide means comprising a guide channel formed by laterally spaced guide walls extending over said endless path and including rounded corners interconnecting straight sections thereof, the base portion of each carrier unit having a front guide roller and a rear guide roller in longitudinal alignment with said front guide roller and both rollers riding between and guided by said guide walls, the carrier body of each carrier unit having a guide roller normally in alignment with the rollers of the base portion of the associated carrier unit and riding between and guided by the guide walls which maintain the carrier bodies normally in an untilted position, the guide roller of each carrier body being permitted to move out of alignment with the rollers of the base portion of the associated carrier unit at the corners and of the guide walls, and auxiliary means at the rounded corners of the guide walls for maintaining the carrier bodies in an untilted position independently of the guide walls.

14. The claim combination of claim 13 wherein the auxiliary means which prevents the tilting of the carrier bodies as they go around the curves of said guide walls comprises rollers on the sides of said carrier bodies and stationary tracks for the latter rollers engaging the rollers to maintain the carrier bodies in a non-tilted position.

References Cited
UNITED STATES PATENTS

| | | | |
|---|---|---|---|
| 3,167,192 | 1/1965 | Harrison et al. | 198—155 X |
| 3,209,888 | 10/1965 | Sterling | 198—33 |
| 3,224,554 | 12/1965 | Moulder et al. | 198—33 |
| 3,231,066 | 1/1966 | Harrison et al. | 198—155 |

EVON C. BLUNK, *Primary Examiner.*

A. C. HODGSON, *Assistant Examiner.*